(12) United States Patent
Scheide et al.

(10) Patent No.: US 8,137,724 B1
(45) Date of Patent: Mar. 20, 2012

(54) PROCESS FOR PREPARATIONS HAVING AN AROMA AND TASTE OF GRILLING, CHAR-GRILLING, CHARCOAL BROILED GRILLING AND WOODFIRED GRILLING

(75) Inventors: Jurgen D. Scheide, Summit, NJ (US); John M. Stefanicha, Fords, NJ (US)

(73) Assignee: Flavor & Food Ingredients, Inc., Middlesex, NJ (US)

( * ) Notice: Subject to any disclaimer, the term of this patent is extended or adjusted under 35 U.S.C. 154(b) by 133 days.

(21) Appl. No.: 12/711,291

(22) Filed: Feb. 24, 2010

Related U.S. Application Data

(60) Division of application No. 12/022,644, filed on Jan. 30, 2008, now Pat. No. 7,988,819, which is a continuation of application No. 10/676,213, filed on Oct. 1, 2003, now abandoned.

(60) Provisional application No. 60/415,642, filed on Oct. 2, 2002.

(51) Int. Cl.
A23L 1/22 (2006.01)

(52) U.S. Cl. .................. 426/533; 426/601; 426/650

(58) Field of Classification Search .................. 426/478, 426/520, 533, 601, 650
See application file for complete search history.

(56) References Cited

U.S. PATENT DOCUMENTS

| | | | |
|---|---|---|---|
| 3,862,014 A | 1/1975 | Atkins et al. | |
| 3,867,262 A | 2/1975 | Rockland et al. | |
| 3,899,606 A | 8/1975 | Forkner | |
| 4,154,866 A | 5/1979 | Dainius et al. | |
| 4,571,342 A | 2/1986 | DiCicca et al. | |
| 4,604,290 A | 8/1986 | Lee et al. | |
| 4,647,466 A | 3/1987 | Japikse et al. | |
| 4,820,538 A | 4/1989 | Schulman et al. | |
| 4,865,868 A * | 9/1989 | Kuss | 426/613 |
| 5,073,398 A | 12/1991 | Kuss | |
| 5,158,795 A | 10/1992 | Chen et al. | |
| 5,169,670 A * | 12/1992 | Yang | 426/607 |
| 5,178,892 A | 1/1993 | Simmons et al. | |
| 5,206,046 A * | 4/1993 | Seeds | 426/589 |
| 5,451,300 A | 9/1995 | Matros et al. | |
| 5,478,443 A | 12/1995 | Cogat | |
| 5,496,579 A | 3/1996 | Weigandt et al. | |
| 5,765,395 A | 6/1998 | Menzenski | |
| 6,267,848 B1 | 7/2001 | Popov | |

OTHER PUBLICATIONS

Office Action of U.S. Appl. No. 13/150,353, dated Aug. 22, 2011.
Office Action of U.S. Appl. No. 13/150,353, dated Dec. 9, 2011.
Office Action of U.S. Appl. No. 13/192,692, dated Nov. 4, 2011.
Aug. 3, 2007 Office Action of U.S. Appl. No. 10/676,213.
Apr. 12, 2010 Office Action of U.S. Appl. No. 12/022,644.
Dec. 13, 2010 Office Action of U.S. Appl. No. 12/022,644.
Mar. 22, 2011 Office Action of U.S. Appl. No. 12/022,644.

* cited by examiner

*Primary Examiner* — Leslie Wong
(74) *Attorney, Agent, or Firm* — Gilman Pergament LLP

(57) ABSTRACT

A system and method for preparation of meat flavorants, and flavorants, having increased flavor and aromatic intensity and which more closely resemble the natural flavor and aroma of cooked meat. Preheated edible, food grade oils and fats are exposed to temperatures between 290° C. and 475° C. under vacuum, in the presence of oxygen. The developing flavor vapors are immediately and completely removed from the heated oils and fats. The mixture of air-purge/flavor-vapor is immediately carried away from the heat transfer surface of the edible oil or fat. An evaporator, preferably a spinning disc, spinning band or thin film evaporator, without a condenser is used as process equipment. The air-purged flavor-vapors are diffused and absorbed in an absorption device into suitable food-grade liquids.

20 Claims, 1 Drawing Sheet

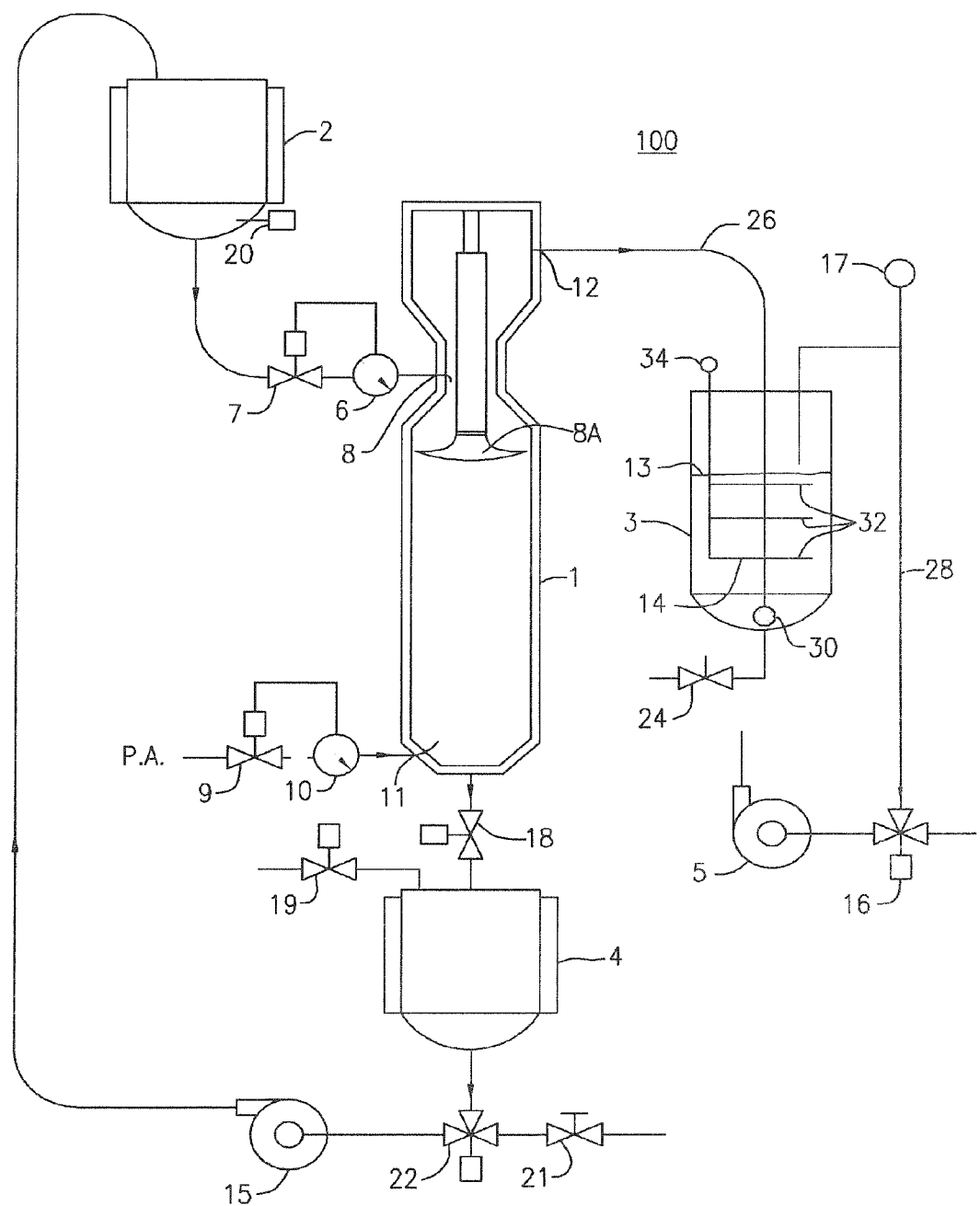

PROCESS FOR PREPARATIONS HAVING AN AROMA AND TASTE OF GRILLING, CHAR-GRILLING, CHARCOAL BROILED GRILLING AND WOODFIRED GRILLING

CROSS REFERENCE TO RELATED APPLICATIONS

This application is a Divisional application of U.S. patent application Ser. No. 12/022,644, filed Jan. 30, 2008, now U.S. Pat. No. 7,988,819, which is a continuation of U.S. patent application Ser. No. 10/676,213, filed on Oct. 1, 2003, now abandoned, which claims priority to U.S. Provisional Application No. 60/415,642, filed Oct. 2, 2002, the entireties of which applications are incorporated herein by reference.

BACKGROUND OF THE INVENTION

This invention pertains to the field of flavorants and particularly pertains to flavorants which impart cooked meat flavor to foodstuffs. More specifically, the present invention is concerned with the preparation of meat flavorants having increased flavor and aromatic intensity and which more closely resemble the natural flavor and aroma of cooked meat.

The desirability of providing flavoring agents which closely simulate the flavor and aromatic characteristics of cooked meat has long been recognized. Such flavoring agents may, for example, be employed with non-meat sources of protein so as to make them more palatable and as meat-like as possible. So, too, they may also be employed with meat-containing or meat-based foods or vegetable-type foodstuffs such as condensed soups, dried meats, packaged gravies, casseroles, etc., in order to supplement or enhance these foods whose organoleptic properties may have been affected by their processing.

Various expedients have been suggested in the prior art in attempts to provide flavoring agents having the organoleptic profile of cooked meat.

U.S. Pat. No. 4,571,342 teaches that a flavoring composition with charred meaty notes can be prepared by subjecting a film of fat or oil to a temperature within the range of 154° C. to 475° C. in the presence of oxygen for an effective period of time, followed by collecting the fat or oil.

U.S. Pat. No. 4,820,538 discloses a process of producing a charcoal broiled flavor by distributing a heated fat or oil as a thin film, which is exposed to a temperature of at least 600° F. for a period of time less than 2 min. to exothermically heat the fat to at least 650° F. and thereafter rapidly cooling the flavor product to a temperature less than 220° F., a minor fraction of the exothermically heated oil being spent as waste vapor.

U.S. Pat. No. 5,496,579 discloses a process and apparatus for producing flavor compositions by subjecting a thin film of fat or oil to an elevated temperature of about 600° F. in the presence of oxygen. The elevated temperature causes the oil to fat to undergo a phase change to produce an exothermic gaseous material. The gaseous material is cooled rapidly to produce a liquid phase and a vapor containing an aerosol. The liquid phase is collected as a first flavorant and the vapor phase through a condenser to recover the aerosol as a flavorant with a more intense grill flavor. The remaining smoke or vapor is exhausted from the apparatus to remove the tarry and acrid flavor notes.

SUMMARY OF THE INVENTION

The resulting flavoring products of the aforementioned processes are constituted as edible oils or fats that have been treated at temperatures of about 650° F. to 887° F. (475° C.) or more in the presence of oxygen for less than 2 minutes or an effective period of time. After the process of exothermically treating the oil or fat the whole liquid is cooled and used as the resulting flavoring product. Due to the extreme conditions of heating, these flavoring oils or fats have undergone sever physicochemical changes, such as oxidation of double bonds of fatty acids, or condensation of glycerol with fatty acid decomposition fragments, to name a few. Thus, the resulting oils and fats have a dark, yellowish-brown to dark brown color and an aroma and taste resembling that of exhausted deep frying oils. These aromas and tastes are undesirable. In addition the exhausted, oxidized oils or fats are not desirable from a health point of view. Nevertheless, they are currently being used as such to flavor food materials.

Accordingly it is an object of the present invention to overcome these shortcomings.

Surprisingly it has been found that nearly colorless and more typically tasting charcoal broiled or charcoal grilled flavorings can be manufactured if preheated edible, food grade oils and fats are exposed to temperatures between 290° C. and 475° C. under vacuum, in the presence of oxygen. In this way the developing flavor vapors are immediately and completely removed from the heated oils and fats. The removal can be accomplished by applying a vacuum during the process in which simultaneously the oxygen in the form of filtered pressurized air purges through the process equipment. Thus, the mixture of air-purge/flavor-vapor is immediately carried away from the heat transfer surface of the edible oil or fat. An evaporator, preferably a spinning disc, spinning band or thin film evaporator, without a condenser is used as process equipment. No condensation is required; instead the air-purged flavor-vapors are diffused and absorbed in an absorption device into suitable food-grade liquids. Suitable food-grade liquids for absorption may contain one or more of the following: food-grade lipids such as unrefined, refined hydrogenated or partially hydrogenated vegetable oils or fats, edible food-grade mono- and diglycerides of fatty acids, animal fats such as butter fat, chicken fat, turkey fat, duck and goose fat and other poultry lipids, beef tallow and pork lard; and processed animal fats like bacon fat and ham fat. Other food-grade absorption liquids may comprise one or more of the following: water, ethyl alcohol, glycerol, 1,2-propandiol, sorbitol, xylitol and other food-grade mono-, di- and polyols; solutions of sugars like sucrose, glucose, fructose and the like.

The flavor-vapors of the process are almost spontaneously removed from the process surface of the evaporator and diffused and absorbed into the absorbing liquid. The pressure of the air-purge stream and the vacuum are preferably adjusted to a constant vacuum of between 700 mm to 250 mm mercury. The absorbing liquid thus contains an increasing concentration of the char-grill flavor vapors until its physicochemical saturation point has been reached. Thereafter, the absorbing liquid is exchanged. For efficiency the edible process oils or fats can be passed through the evaporator several times by circulation, in order to achieve a high concentration of flavor vapors in the absorbing liquid, while at the same time keeping the quantity of edible process oils or fats to a minimum. These edible process oils or fats develop an increasingly darker color, depending on the number of passes through the evaporator. At the end, the exhausted process oils or fats are discarded, thus avoiding human consumption of oxidized or partially oxidized oils or fats. This is another important advantage over the current known processes. A further advantage of this process is the fact that no carbonaceous material is present in the resulting flavoring product, because the flavor vapors prior to absorption are free of such carbonaceous material.

These and other objects of the invention will become more apparent from the following detailed description and accompanying drawings.

BRIEF DESCRIPTION OF THE DRAWING

FIG. 1 is a schematic illustration of equipment and process flow for a preferred embodiment of a flavoring processing and absorption system according to the present invention.

DETAILED DESCRIPTION OF THE PREFERRED EMBODIMENT

In the following description, for purposes of explanation, specific numbers, materials and configurations are set forth in order to provide a thorough understanding of the invention. It will be apparent, however to one having ordinary skill in the art that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

The invention will be described by reference to the accompanying drawings. Now referring to FIG. 1 a flavor processing and absorption system according to the present invention is depicted. The flavor processing and absorption system 100 comprises evaporator 1, process oil kettle (POK) 2, flavor vapor absorption vessel (FVAV) 3, process oil collection vessel (POCV) 4 and vacuum pump (VP) 5. During processing system 100 is kept under continuous vacuum. System 100 further comprises a plurality of valves 7, 9, 16, 19, 21, 22 and 24. Purified pressurized air (PA) is introduces into the evaporator 1 at the bottom of the equipment by means of a combination of injection nozzles (IN) 11, using pressure control device 9 and flow meter 10. It is important for this invention that pressurized air is introduced into the flavor processing and absorption system in a counter flow manner to the process oil flow. If desired the flow rate and pressure of the pressurized air may be adjusted in order to vary the flavor characteristics of the flavor vapors. Consequently, air pressure, air flow rate and vacuum may have to be preadjusted and balanced prior to actual processing.

As process oils, kosher or unkosher, preferably vegetable oils or fats are used. These oils or fats may be of a refined or unrefined, hydrogenated or partially hydrogenated nature. Processed or unprocessed animal fats may be employed as well. The process oil is preheated in a process oil kettle (POK) 2. The preheated oil is introduced into the evaporator 1 through oil inlet 8 and dispersed onto the spinning disc 8A. Centrifugal force distributes the process oil evenly onto the surface of the wall of preheated evaporator 1. Flavor vapors develop. Upon development they are oxidized by the continuing air stream. At the same time, the flavor vapors are purged and immediately carried away by the vacuum through vapor outlet 12 and introduced into the absorption liquid 13 through a gas diffusion device 14. In general, the flavor absorption liquid is kept in the flavor absorption vessel at ambient temperature. Only in such cases, where solid fats or lipids are desirable as absorption liquids, is it necessary to heat the fat or lipid about 5° C. above its melting point, in order to guarantee a sufficient flavor vapor diffusion and absorption. The excess process oil flows by gravity along the length of the evaporator 1 and is collected in the process oil collection vessel 4. Process oil can be recycled several times to the process oil kettle 2 by means of a positive displacement pump 15.

In a most preferred embodiment gas diffusion device 14 is positioned inside the flavor vapor absorption vessel 3 and in one embodiment preferably consists of a perforated ball 30 positioned at the end of line 26, and at least one but preferably two sets of perforated discs 32 oriented horizontally in vessel 3. Due to vacuum applied through line 28 the vapor is drawn through perforated ball 30 into the flavor absorption liquid 13, which creates turbulence in the liquid 13. The turbulence is diffused and broken at the perforated discs 32, thus allowing the vapors to be absorbed in liquid 13. The temperature of the flavor absorption liquid 13 can be monitored and controlled by a thermostat-thermocouple 34. The perforated ball 30 at the end of line 26 may be fixed but preferably is rotatable for more efficient diffusion and absorption. A slow moving gas inlet agitator also may optionally substitute ball 30.

It will be understood that this flavor processing and absorption system, therefore, involves a very careful control primarily of the balance between pressure air flow and vacuum at a predetermined temperature of the evaporator.

The invention will now be described by reference to the following examples of preferred embodiments:

Example 1

At the beginning the flavor process and absorption system is balanced as follows:

The temperature of the inside wall of the evaporator 1 is stabilized at 310° C. Employing magnet valves 7, 19, 21, 22 and 24 a closed vacuum is applied by vacuum pump 5 to the system and adjusted to 700 mm mercury by means of air valve 16. Then pressurized air of 10 PSI, which was filtered and dehumidified, is allowed to purge into the system at a flow rate of 10 cfu per hour, which causes the vacuum to drop to 750 mm mercury, as indicated at vacuum gauge 17. By throttling air valve 16 the vacuum in the whole system is again adjusted to 700 mm mercury, now with a constant sir stream purging through the system.

1.5 kg of commercial sunflower oil is preheated in the process oil kettle 2 to 200° C. and introduced into the evaporator 1 at point 8 by opening magnet valve 7 and adjusting the flow rate to 60 g per minute by means of flow meter 6. The developing flavor vapors are purged through vapor outlet 12 and diffused into the flavor absorption liquid 13 through a gas diffusion device 14.

4.0 kg of a combination of partially hydrogenated soybean and cottonseed oil (Durkex 500 High Stability Oil, see Table 1) is used as flavor absorption liquid 13 at ambient temperature. When all process oil from POK 2 has been consumed and collected in POVC 4 magnet valves 7 and 18 are closed, triggered by level switch 20, while at the same time magnet valves 19 and 22 are opened. This setting allows the balanced pressure air/vacuum adjustment to remain stable in the flavor process and absorption system EV 1 and FVAV 3, while at the same time the collected process oil is recycled from POVC 4 to POK 2 by means of positive displacement pump 15. Valve settings 18 and 19 are reversed and after the preset vacuum has balanced, valve 7 is opened again. This recycling and processing of the process oil is repeated two more times, after which it has turned to a dark brown color. The process oil is discarded through valve 21 and cooled through a heat exchanger.

During the entire process the temperature of the flavor absorption liquid 13, which is now saturated with flavor vapor, did not rise by more than 10° C. The original color of liquid 13 did not measurably change. The product was collected through valve 24 for use in food applications. The collected flavor product has a very strong char-grilled aroma and taste, but lacks the undesirable and burnt "deep fat frying" off-flavor. This product can be used as a liquid as such or it can be spray dried and used in powder applications or otherwise applied, all of which is within the ordinary skill of the art.

TABLE 1

Durkex 500

| Typical Analytical Data before absorption: | | |
| --- | --- | --- |
| Color (Lovibond, 5¼" cell); | Red | 0.3 |
| Color (Lovibond, 5¼" cell); | Yellow | 3.0 |
| Mettler Dropping Point (° C.) | | 17.5 |
| Free Fatty Acids (% as oleic acid) | | 0.22 |
| Solid Fat Index @ N 10° C. | | 16 |
| Solid Fat Index @ N 20° C. | | 1.5 |
| Typical Analytical Data after absorption: | | |
| Color (Lovibond, 5¼" cell); | Red | 0.6 |
| Color (Lovibond, 5¼" cell); | Yellow | 6.0 |
| Mettler Dropping Point (° C.) | | 15.6 |
| Free Fatty Acids (% as oleic acid) | | 1.93 |
| Solid Fat Index @ N 10° C. | | 11.7 |
| Solid Fat Index @ N 20° C. | | 1.8 |

Example 2

The balancing of the flavor process and absorption system is executed as follows:

EV 1 Temperature 340° C.

Initial Vacuum 580 mm Hg

Air Pressure 20 PSI

Air Flow Rate 18-20 cfu/h

Vacuum Drop to 690 mm Hg

Balanced Air/Vacuum System 660 mm Hg 1.5 kg of commercial sunflower oil is preheated in the process oil kettle 2 to 200° C. and introduced into the evaporator 1 at point 8 by opening magnet valve 7 and adjusting the flow rate of 60 g per minute by means of flow meter 6. The developing flavor vapors are purged through vapor outlet 12 and diffused into the flavor absorption liquid 13 through gas diffusion device 14.

4.0 kg of Natural Beef Flavor #13001, Lot # SL 08601 (Flavor & Food Ingredients, Inc., see Table 2) which has a yellow color and an aroma and taste of light roast beef, is heated to 45° C. in FVAV 3 and maintained at that temperature. The process oil from POK 2 is passed four times through the flavor process and absorption system 100 as described in Example 1. During the entire process the temperature setting of the flavor vapor-absorbing liquid was maintained at 45° C. Its color did not change from its original color and its temperature at the end of the process was recorded at 53.5 C. The liquid product was collected through valve 24. Its aroma and taste were evaluated to represent that of a typical char-broiled beef hamburger character.

TABLE 2

Natural Beef Flavor #13001

| Typical Analytical Data before absorption: | | |
| --- | --- | --- |
| Color (Lovibond, 5¼" cell) | Red | 10.5 |
| Color (Lovibond, 5¼" cell) | Yellow | 70.0 |
| Mettler Dropping Point (° C.) | | 42.0 |
| Free Fatty Acids (% as oleic acid) | | 2.0 |
| Solid Fat Index @ N 10° C. | | 29.5 |
| Solid Fat Index @ N 20° C. | | 19.5 |
| Typical Analytical Data after absorption: | | |
| Color (Lovibond, 5¼" cell) | Red | 11.0 |
| Color (Lovibond, 5¼" cell) | Yellow | 70.0 |
| Mettler Dropping Point (° C.) | | 39.0 |
| Free Fatty Acids (% as oleic acid) | | 3.95 |
| Solid Fat Index @ N 10° C. | | 27.9 |
| Solid Fat Index @ N 20° C. | | 17.3 |

Example 3

The balancing of the flavor process and absorption system is executed as follows:

EV 1 Temperature 370° C.

Initial Vacuum 510 mm Hg

Air Pressure 20 PSI

Air Flow Rate 25-30 cfu/h

Vacuum Drop to 700 mm Hg

Balanced Air/Vacuum System 610 mm Hg 1.5 kg of partially hydrogenated soybean oil (Preference Oil, C&T Qincy) is preheated in the process oil kettle 2 to 200° C. and introduced into the evaporator 1 at appoint 8 by opening magnet valve 7 and adjusting the flow rate to 60 g per minute by means of flow meter 6. The developing flavor vapors are purged through vapor outlet 12 and diffused into the flavor absorption liquid 13 through a gas diffusion device 14.

A mixture of 2.0 kg food-grade glycerol and 2.0 kg food-grade 1,2-propandiol, which is clear and colorless, is used as flavor absorption liquid 13 at ambient temperature in FVAV 3. The process oil from POK 2 is passed four times through the flavor process and absorption system 100 as described in Example 1. During the entire process the temperature of the flavor absorption mix 13 of glycerol and 1,2-propandiol did not markedly increase; at the end of the process it was recorded at 32.3° C. Liquid 13 was collected through valve 24. The aroma of the slightly reddish flavor product was evaluated to represent a strong woodfired grill character; the taste being a strong woodfired grill character, with some sweetness prevailing.

What is claimed is:

1. A process for manufacturing grilled, charcoal broiled, charcoal grilled or wood-fired flavorings comprising the steps of:
    heating edible, food grade oils or fats to temperatures between about 290° C. and about 475° C. under vacuum, in the presence of oxygen;
    removing vapor generated by said heating from said heated oils or fats; and
    recovering said vapor in an absorption liquid.

2. The invention according to claim 1 said removal further comprising the step of applying a vacuum during the process in which simultaneously the oxygen in the form of filtered pressurized air purges through the process equipment.

3. The invention according to claim 1 further comprising drawing said vapor into an absorption vessel turbulently, wherein said absorption liquid is disposed in said absorption vessel.

4. The invention according to claim 3, said turbulent drawing comprising drawing said vapor through a perforated ball situated in said absorption liquid.

5. The invention according to claim 3 further comprising the step of diffusing said turbulence to permit said vapor to be absorbed in said liquid.

6. The invention according to claim 5 further comprising employing at least one disc horizontally oriented in said absorption liquid to diffuse said turbulence.

7. The invention according to claim 2 further comprising selectively adjusting the flow rate and/or pressure of said pressurized air to vary the flavor characteristics of the flavor vapor.

8. The invention according to claim 7 further comprising preadjusting air pressure, air flow rate and vacuum in a system performing said process prior to processing.

9. The invention according to claim 1 further comprising preheating said process oil or fat in a process oil kettle;
   introducing said preheated oil or fat into a preheated evaporator; and
   dispersing said oil or fat onto the surface of a wall of said evaporator to develop said vapor, said vapor comprising one or more flavor vapors.

10. The invention according to claim 9 further comprising oxidizing said flavor vapors in said evaporator.

11. The invention according to claim 1 further comprising the step of recovering the heated oils or fats and subjecting same to reheating at least once such that said removing and said recovering steps are repeated at least once, thereby recycling said heated oils or fats.

12. The invention according to claim 1 further comprising recovering said absorption liquid.

13. The invention of claim 1, wherein at least one of:
   the absorption liquid has a physicochemical saturation point and the absorption liquid operates to include an increasing concentration of the vapor until the physicochemical saturation point of the absorption liquid is reached; and
   the absorption liquid operates to be replaced or exchanged when the physicochemical saturation point is reached.

14. The invention of claim 1, wherein the vapor is substantially or completely free of carbonaceous material prior to the recovery in the absorption liquid, thereby resulting in the flavoring being substantially or completely free of carbonaceous material, the flavoring comprising the flavored absorption liquid having the recovered vapor stored therein.

15. The invention of claim 5, further comprising heating the absorption liquid to about 5° C. above a melting point of the absorption liquid when the absorption liquid comprises solid fats and/or lipids, thereby permitting the vapor diffusion and absorption to be sufficient.

16. The invention of claim 1, wherein the recovery step further comprises absorbing the vapor into the absorption liquid such that the resulting flavor product or the flavoring is created for use in food applications.

17. The invention of claim 9, further comprising introducing pressurized air defining an air stream into the evaporator such that the pressurized air stream flows into the evaporator in a direction counter to the flow of the heated process oil or fat through the evaporator and the pressurized air stream operates to oxidize the flavor vapor.

18. The invention of claim 9, wherein the evaporator operates to employ centrifugal force to distribute the process oil or fat substantially evenly onto the surface of the wall of the evaporator.

19. The invention of claim 2, wherein at least one of the air pressure and the vacuum pressure operates to be adjusted to a constant vacuum of between about 700 mm mercury to about 250 mm mercury.

20. The invention of claim 1, further comprising discarding exhausted process fat or oil that is oxidized or partially oxidized, thereby avoiding human consumption of the oxidized or partially oxidized process fat or oil.

* * * * *